Nov. 19, 1957 O. KORNEI 2,813,932

MAGNETIC TRANSDUCER HEAD AND METHOD OF MAKING SAME

Filed March 30, 1951 2 Sheets-Sheet 1

INVENTOR.
OTTO KORNEI
BY
Eber J. Hyde
ATTORNEY

MAGNETIC TRANSDUCER HEAD AND METHOD OF MAKING SAME

Filed March 30, 1951 2 Sheets-Sheet 2

INVENTOR.
OTTO KORNEI
BY Eber J. Hyde
ATTORNEY

United States Patent Office 2,813,932

Patented Nov. 19, 1957

2,813,932

MAGNETIC TRANSDUCER HEAD AND METHOD OF MAKING SAME

Otto Kornei, Cleveland Heights, Ohio, assignor, by mesne assignments, to Clevite Corporation, Cleveland, Ohio, a corporation of Ohio Application March 30, 1951, Serial No. 218,421

7 Claims. (Cl. 179—100.2)

This invention pertains to a magnetic transducer head for use with magnetic recording and reproducing equipment.

In the past high fidelity magnetic transducer heads of consistent quality have been hand built in small quantities. Magnetic transducer heads have also been built in large quantities by mass-production techniques but consistent quality could not be obtained as it has not been possible to maintain, in mass-production, the tolerances and techniques required to produce excellent heads.

It is an object of the present invention to provide a head construction which lends itself to mass-production techniques and results in uniformly excellent magnetic transducer heads.

Another object of the present invention is to provide a method of constructing a magnetic transducer head which produces uniformly excellent heads whether the techniques are used on small or large numbers of heads.

Still another object of the present invention is to provide a high quality magnetic transducer head of such construction that it may be inexpensively manufactured by mass-production techniques.

A further object of the present invention is to provide a magnetic transducer head which is protected against moisture, fungus growth and vibration.

In accordance with one feature of the invention there is provided a magnetic transducer head comprising a substantially C-shaped pole piece having two planar end faces which are substantially perpendicular to the plane of the pole piece. A second pole piece is provided having two planar end faces which are substantially perpendicular to the plane of the second pole piece. Spring means secure thees two pole pieces together with the end faces of one in closely spaced face-to-face parallel relationship with the end faces of the other by exerting opposing forces on the two pole pieces in directions substantially perpendicular to the planes of the end faces.

Another aspect of the invention lies in the method of manufacturing a magnetic transducer head comprised of two pole piece members having planar end faces each with a coil wound about it, which includes the steps of exerting holding forces against the two pole piece members only in a direction substantially perpendicular to the plane of the end faces; then, while said holding force is being maintained, substantially enclosing the coil means and the pole piece members in housing means, and filling the housing means with a liquid and hardenable material which is then caused to harden to permanently secure the component parts of the head in the relative positions imparted to them by the holding forces.

For a better understanding of the present invention, together with other and further objects thereof, reference is had to the following description taken in connection with the accompanying drawings, and its scope will be pointed out in the appended claims.

In the drawings Fig. 1 is an isometric view of a C-shaped pole piece with a coil wrapped about it. Fig.

2 is a top view of two pole piece and coil assemblies held together by a spring clip. Fig. 3 is a face view of the assembly shown in Fig. 2. Fig. 4 shows the assembly of Figs. 2 and 3 mounted in a housing. Fig. 5 shows the device of Fig. 4 held in a jig for casting resin inside the housing.

Figure 1:
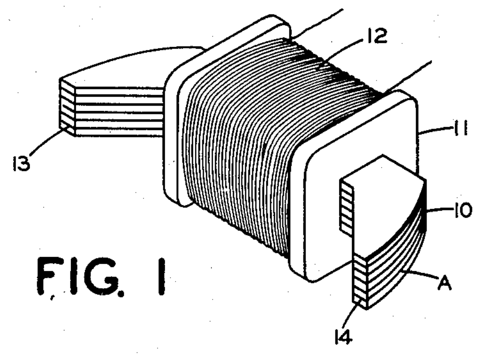

With reference to the drawings Fig. 1 shows a substantially C-shaped pole piece 10 about which there is positioned a plastic bobbin 11 and a coil 12 formed of a large number of turns of fine wire. The pole piece 10 preferably is formed of a plurality of thin laminations of magnetizable material, though a single piece of ferrite or the like may be used. The pole piece 10 has two planar end faces 13 and 14 the plane of which is substantially perpendicular to the plane of the pole piece. To form an operative head assembly two similar C-shaped pole piece assemblies A and B as shown in Fig. 1, are connected together and the coils are suitably connected; or one of the C-shaped assemblies and another pole piece assembly of different shape but of the same thickness may be connected together. When two similar pole piece assemblies A and B are used it results in the structure shown in Figs. 2 and 3. Two spring clips 15 and 16 are used to hold the two pole piece assemblies together with the end faces 13, 14 of one pole piece in closely spaced face-to-face parallel relationship with the corresponding end faces of the other pole piece assembly. The spring clips exert opposing forces tending to force the end faces of the two pole pieces together in directions substantially perpendicular to the planes of the end faces, and no sidewise thrust is exerted by the spring clips against the pole pieces. This lack of sideways thrust is very important as, in the prior art, it was the effect of this sideways thrust which resulted in many poor heads. The reason for the benefits from using the spring clips 15, 16 will be discussed in detail in connection with Figs. 9 and 10.

Figure 2:
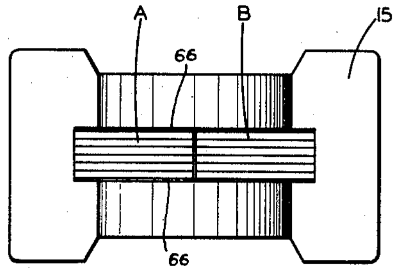
Figure 3:
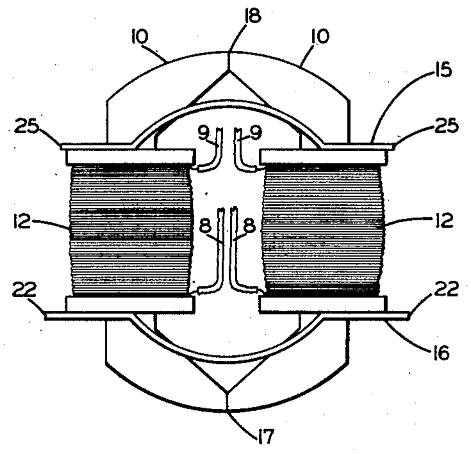
Figures 5, 11:
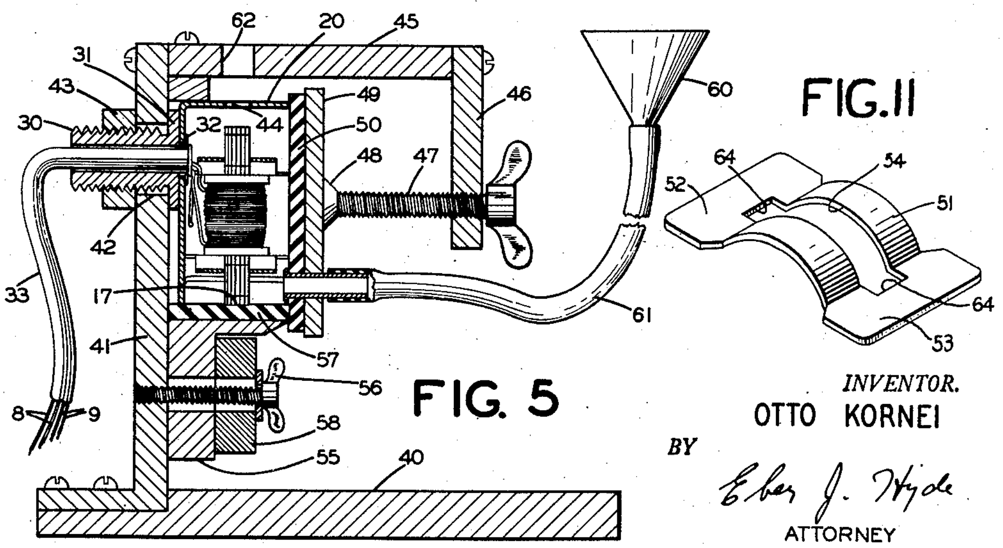
Figure 11 is an isometric view of a spring clip used in the head.

As shown in Figures 2, 3 and 11 each spring clip 15, 16 comprises a central bowed portion 51 and two flat end or spacer portions 52, 53. The central portion 51 has an opening 54 through which extends the pole pieces 10 of the transducer head. The end surfaces 64 of the opening 54 of the flat portions 52, 53 bear against the outer edge face 65 of the pole piece 10 and push the two pole pieces 10 toward each other. It is to be noted from Figure 2 that the spring clips 15, 16 engage the pole pieces 10 only along the outer edge face 65 and not along the side face 66 of the pole pieces so that there is no possibility of a force being exerted by the spring clips on the pole pieces in any direction except substantially perpendicular to the planar end face of the pole piece.

As is well known to the art shims of very thin non-magnetic material may be placed between the end faces of the two pole piece assemblies to maintain fixed, definite gaps at locations 17 and 18. If slightly more output is desired from the head at the expense of some of the humbucking properties, the non-magnetic shim in the back gap 18 may be omitted. For a detailed description of humbucking, reference may be made to Semi J. Begun's and Alfred P. Dank's United States patent application Serial No. 687,047, filed July 30, 1946, patented May 17, 1955, No. 2,708,694.

Figure 4:
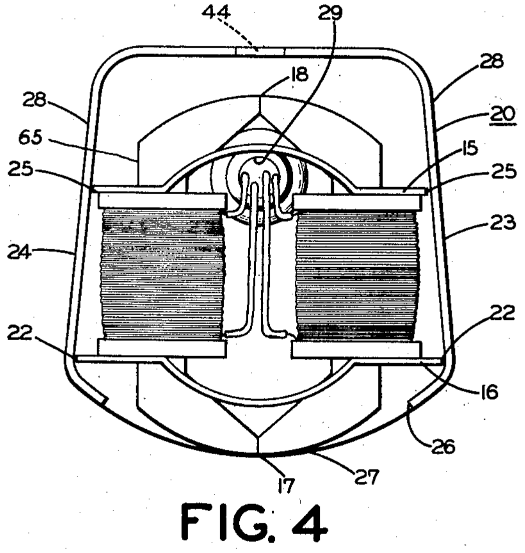

It is usual to connect the two ends 9 of the coils 12, 12 together inside the head and to bring the other two ends 8 of the coils outside of the head for connection to an electrical circuit. In the device of the present invention all four ends of the coils 12, 12 are brought out of the head as is shown in Figs. 4 and 5. At a location outside of the head the two wires 8 or the two wires 9 may be soldered together. This construction is preferred as some operators occasionally want to make a connection across only one of the coils 12.

With suitable lead connection an operative magnetic transducer head as shown in Fig. 3 is formed by holding two pole piece and coil assemblies A and B together by means of the spring clips 15, 16, but the positioning is not sufficiently permanent for commercial use with its rough handling. To permanently secure the several parts in their desired relative positions the sub-assembly shown in Fig. 3 is placed in a housing 20, shown in Fig. 4, and a hardenable liquid material 21 is poured into the housing to fill it.

This material, which may be a polymerizing synthetic resin, has to be chosen carefully so as not to set up objectionable strains upon hardening and upon subsequent ageing. Such strains could, otherwise, dislocate the embedded parts thus disturbing their very critical relative positioning and degrading the performance of the transducer head. One suitable resin is made by the Ciba Corporation, and is known as "Hysol 6020."

Figures 6, 7, 8:
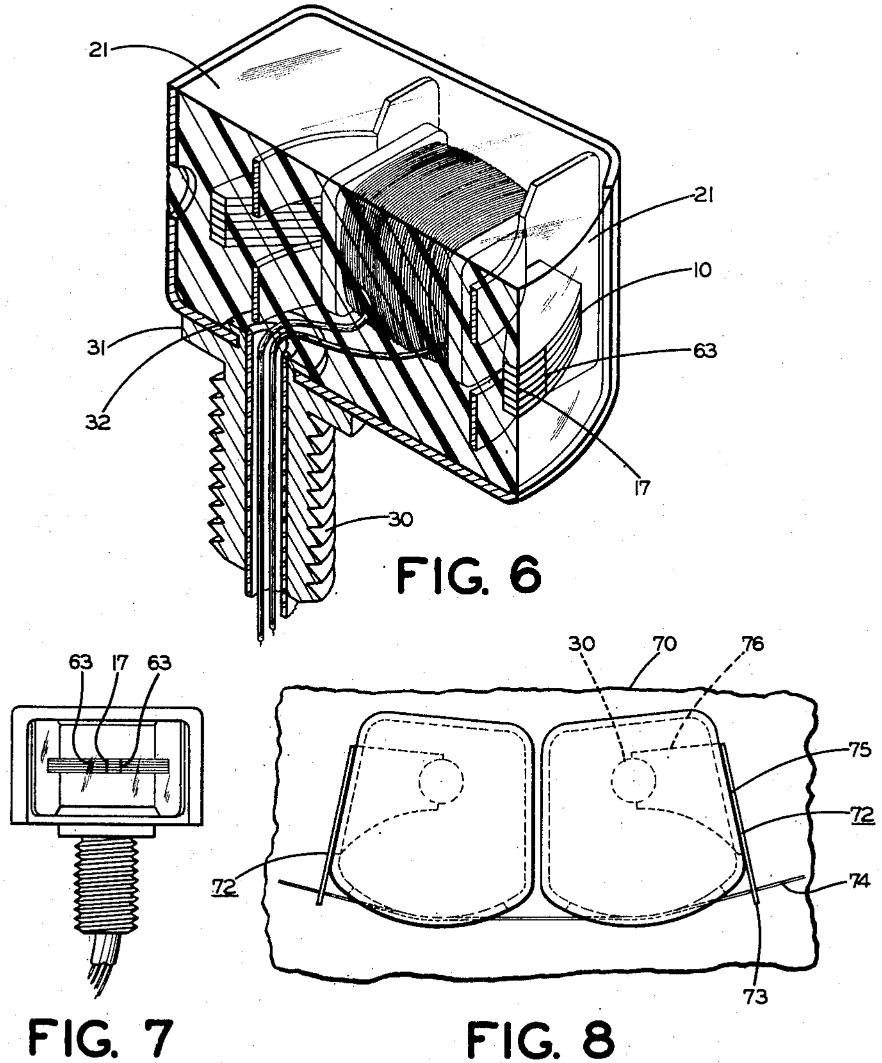
Fig. 6 is a sectional view showing one-half of the head assembly.
Fig. 7 is a face view of a completed head.
Fig. 8 is a top view of two adjacent heads, ready for operation and mounted on a common mounting plate.

The housing 20 is preferably made of mu-metal or the like so that it shields the operative sub-assembly from stray magnetic fields and supplements and humbucking of the head to reduce the hum induced in the output from the head to a very low value. One of the major faces of the housing 20 is open so that the operative sub-assembly may easily be slid into place. The housing is slightly wider at the front end where the recording-reproducing gap 17 is located than at the rear end where the back gap 18 is positioned. It has been found that the side walls 28 of the housing 20 should include an angle of from 5 to 30 degrees, and that the preferred angle should be about 12 degrees. This facilitates the effective coupling of the record member to two or more heads which may be mounted closely adjacent each other in a recording-reproducing device as shown in Fig. 8.

The particular physical arrangement of the heads permits to obtain intimate contact between the proper amounts of arcuate surfaces of recording medium and transducer head, with a minimum of head spacing without the use of additional transverse guide means to cause the record medium to "wrap around" the pole pieces in the vicinity of the "air" gap.

The spring clips 15, 16 preferably are of different size, the clip 16 being slightly longer than clip 15, and they are so dimensioned that the ends 22 of the clip 16 abut against the inner wall of the housing 20 at the widest point where the walls 23, 24 turn inwardly. The back clip 15 is so dimensioned that its ends 25 engage the inner faces of the side walls 23, 24 to position the operative sub-assembly in the housing with the outer edge of the front air gap 17 substantially exactly aligned with the front edge 27 of the housing 20, as shown in Fig. 4. The spring clip 15 prevents the operative sub-assembly from sliding back too far into the housing 20, and the spring clip 16 keeps the assembly from sliding too far forward. Thus the spring clips which hold the two pole pieces in exact and perfect alignment also serve to hold the sub-assembly in its proper position with respect to the housing.

As seen in Fig. 4 the housing 20 has an opening 26 in its front wall to expose the air gap 17 and portions of the core material on either side thereof to contact with a record member as the record member is driven by in engagement with the head. A hole 29 is provided in the bottom wall of the housing 20 through which the lead wires 8 and 9 from the two coils extend to the outside. In order to facilitate mounting the head in the magnetic recorder-reproducer device an externally threaded hollow stud 30 is connected to the housing at the location of the hole 29 with the bore of the stud aligned with the hole 29. The stud 30 has a broad shoulder portion 31 which fits flat against the housing 20 and it includes a smaller end portion 32 which extends into the housing 20 where it is spun over to form an inner collar to hold the stud in place. A length of tubular insulating or shielding material 33 is used to cover the lead wires from the inside of the housing 20 over a suitable distance outside the housing, and the wires 8, 9 are suitably insulated from each other within the insulating or shielding material 33.

The stud 30, in addition to forming the mount for the head in the assembled machine, is used to hold the housing and sub-assembly in a fixture while the resin is being poured, as shown in Fig. 5.

The pouring fixture is comprised of a base 40 to which is attached an upright wall 41 having a hole 42 through which the stud 30 extends. A nut 43 is threaded onto the stud 30 to hold the housing 20 in place with the recording-reproducing gap 17 downward and with the hole 44 in the bottom of the housing uppermost. An overhanging member 45 is connected to the upright wall 41 and an arm 46 extends downwardly. A wing-nut screw 47 extends through the arm 46 and has a swivel plate 48 at its inward end for abutting against a backing plate 49. A soft rubber sheet 50 is connected to the backing plate 49 and entirely closes the open face of the housing 20. The screw 47 is turned sufficiently to force the rubber sheet 50 against the edge of the housing to prevent the liquid resin from leaking out during the pouring operation. A bottom support 55 is secured to the wall 51 by means of a screw 56, and a rubber member 57 is positioned between the upper face of the support 55 and the bottom portion of the head housing 20 to close the opening 26 to prevent liquid resin from leaking out. It is undesirable to have the liquid resin cover the outer face of the pole pieces at the location of the recording-reproducing gap 17 so that portion of the operative sub-assembly within the housing is pressed tightly against the rubber sheet 57 to exclude the liquid resin. A highly satisfactory method of urging the pole pieces against the rubber sheet 57 is to mount a magnet 58 adjacent the pole pieces and on the other side of the rubber sheet 57. The magnet exerts a pulling force on the pole pieces holding them in their most forward position within the housing 20 and tightly against the sheet 57.

Liquid resin is poured into the housing 20 by any convenient means; for example, the funnel 60 is connected to tube 61, and tube 61 extends through the rubber member 50 to the open face of housing 20. It is desirable that the housing be filled from the bottom, the displaced air escaping through vent hole 44. The operator can determine when the housing 20 is full by looking through hole 62 in the member 45. Suitable means for shutting off the flow of liquid resin to the head may be used, and when the housing 20 is full the resin is caused to harden. After hardening, the head is removed from the fixture and the portion of the resin adjacent the air gap 17 may be ground off and polished to remove any roughness which would cause improper contact between pole surface and recording medium.

When the head is completed, as shown by Fig. 6, the resin and the pole piece at the location where the record member comes in contact with the head define a continuous, smoothly curved surface with the resinous material forming a guide to and away from the air gap area of the pole pieces. The material of pole piece 10 is exposed from the air gap 17 to the line 63, and the material of the other pole piece is similarly exposed.

The resinous material 21 forms a smoothly curved approach up to the line of the exposed pole piece material, and beside the exposed pole piece the resinous material forms a continuation of the curved surface of the pole piece so that the record material which is usually somewhat wider than the pole piece is supported across its entire width when it is in contact with the head.

Fig. 7 shows a completed head with the air gap 17 exposed between the two lines 63 where the pole pieces emerge from the resinous material.

Fig. 8 shows two heads mounted side-by-side on a mounting member 70 and shows two guide members 72 for the record tape 74. Each tape guide comprises an L-shaped member having two legs 75, 76. The leg 76 fits half-way around the threaded stud 30 and is located between the mounting member 70 and the shoulder portion 31 underneath the housing 20. The leg 75 extends outwardly from the mounting member 70 and has two spaced apart guide portions 73 which extend beyond and on both sides of the tape. The tape 74 passes between these guide portions and is thereby accurately guided onto the transducer head.

Figure 9:
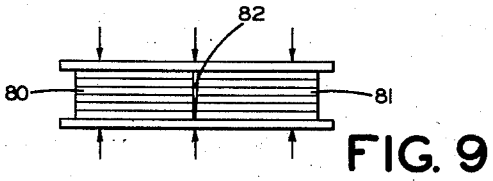
Fig. 9 is a schematic showing a disadvantage of prior art heads.

Figure 9 schematically illustrates prior art methods of assembling transducer heads. Two pole piece portions 80, 81 of laminated or single piece construction were provided. The plane of the pole face was made as near as possible perpendicular to the planes of the laminations, but minor deviations occurred in most cases. Then the two pole pieces 80, 81 were clamped in position by forces substantially perpendicular to the plane of the pole pieces resulting in a gap 82 of varying width. Recording and reproducing signals with such an air gap results in severe loss of high frequency signals and is generally undesirable because the performance of heads coming from the production line cannot be predicted. In the head provided by this invention the plane of the pole face of the two pole piece structures 10 and 10' is as near as possible perpendicular to the plane of the pole pieces, but should the two planes be slightly off the perpendicular location the forces exerted by the spring clips 15, 16 hold the two pole pieces 10 and 10' together in such a manner that the air gap 17 is perfectly parallel and uniform.

Figure 10:
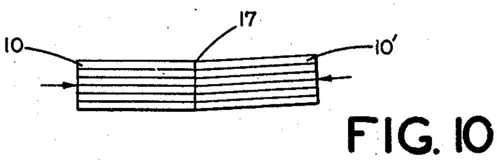
Fig. 10 is a schematic showing the advantage of the present head construction.

As shown in Fig. 10 the two pole pieces 10, 10' will not, under those conditions, lie in the same plane. This, however, does not adversely affect the operation of the head. Accordingly, heads produced in accordance with this invention give uniformly good results.

The previous discussion states that there should be no sideways thrust exerted against the pole piece structures by the spring clips. This condition is highly desirable but some sideways thrust is permissible so long as it is sufficiently low compared to the desired endwise thrust to result in the pole pieces 10 and 10' being held in position shown in Fig. 10 and not in the position shown in Fig. 9.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetic transducer head comprising substantially closed magnetic path means formed of two substantially C-shaped pole pieces each having two spaced apart planar end faces substantially perpendicular to the plane of the pole pieces, shim means, spring means biasing the two pole pieces together with their planar end faces in engagement with opposite sides of said shim means and defining two gaps in said substantially closed magnetic path means, said spring means engaging said magnetic path means at a location intermediate the said two gaps and exerting on the two pole pieces biasing forces only in a direction substantially perpendicular to said shim means and said spring means being the sole means determining the alignment of said two pole pieces on opposite sides of said shim means, said magnetic path means being free of any force component established by said spring means parallel to the plane of said pole faces, and coil means around at least one of said pole pieces.

2. A magnetic transducer head as set forth in claim 1, further characterized by said spring means comprising two spaced apart springs each symmetrically placed with respect to said two gaps.

3. A magnetic transducer head comprising substantially closed magnetic path means formed of two substantially C-shaped pole pieces each having two spaced apart planar end faces substantially perpendicular to the plane of the pole pieces, spring means comprising a metal clip having a central opening through which said two pole pieces extend biasing the two pole pieces together with their planar end faces face-to-face and defining two gaps in said substantially closed magnetic path means, said spring means engaging said magnetic path means at a location intermediate the said two gaps with the side faces of said two pole pieces spaced from said spring means and with the spring means exerting on the two pole pieces biasing forces only in a direction substantially perpendicular to said end faces whereby said magnetic path means is free of any force component established by said spring means parallel to the plane of said pole faces, and coil means around at least one of said pole pieces.

4. A magnetic transducer head comprising substantially closed magnetic path means formed of two substantially C-shaped pole pieces each having two spaced apart planar end faces substantially perpendicular to the plane of the pole pieces; spring means biasing the two pole pieces together with their planar end faces face-to-face and defining two gaps in said substantially closed magnetic path means, said spring means in engagement with both of said pole pieces at locations intermediate the said two pairs of confronting end faces and exerting on the two pole pieces biasing forces only in directions substantially perpendicular to said end faces, and said spring means having spacer portions extending away from said pole pieces; coil means around at least one of said pole pieces; a housing having an opening around said pole pieces and said spring means with the spacer portions of said spring means engaging the inner wall of said housing to accurately position the pole pieces with respect to said housing; and hardened embedding material filling said housing and surrounding said pole pieces.

5. A magnetic transducer head as set forth in claim 4, further characterized by said housing having two side walls symmetrical with respect to a plane defined by said two pairs of confronting end faces, said two side walls including an angle of from 5 to 30 degrees.

6. A magnetic transducer device characterized by at least two transducer heads in accordance with claim 5, means mounting said heads together in closely spaced side-by-side relationship with said adjacent side walls substantially parallel.

7. A magnetic transducer head including pole piece means defining an air gap; a housing around said pole piece means having two side walls symmetrical with respect to said air gap, said two side walls including an angle from 5 to 30 degrees.

References Cited in the file of this patent

UNITED STATES PATENTS

| | | |
|---|---|---|
| 1,941,476 | Jensen | Jan. 2, 1934 |
| 2,020,212 | Quam | Nov. 5, 1935 |
| 2,277,305 | Clopton | Mar. 24, 1942 |
| 2,456,767 | Camras | Dec. 21, 1948 |

(Other references on following page)

UNITED STATES PATENTS

| | | |
|---|---|---|
| 2,481,393 | Camras | Sept. 6, 1949 |
| 2,508,485 | Begun | May 23, 1950 |
| 2,523,576 | Kornei | Sept. 26, 1950 |
| 2,538,892 | Begun | Jan. 23, 1951 |
| 2,561,338 | Camras | July 24, 1951 |
| 2,574,707 | Pettus | Nov. 13, 1951 |
| 2,587,097 | Berlant | Feb. 26, 1952 |
| 2,612,681 | Camras | Oct. 7, 1952 |
| 2,621,259 | Grantham | Dec. 9, 1952 |
| 2,628,286 | Rettinger | Feb. 10, 1953 |
| 2,700,073 | Kleis | Jan. 18, 1955 |

FOREIGN PATENTS

| | | |
|---|---|---|
| 617,796 | Germany | Aug. 28, 1935 |
| 262,323 | Switzerland | Sept. 16, 1949 |